(12) United States Patent
Nguyen

(10) Patent No.: US 8,881,813 B2
(45) Date of Patent: Nov. 11, 2014

(54) METHODS OF FORMING HIGH-POROSITY FRACTURES IN WEAKLY CONSOLIDATED OR UNCONSOLIDATED FORMATIONS

(75) Inventor: Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 337 days.

(21) Appl. No.: 13/429,660

(22) Filed: Mar. 26, 2012

(65) Prior Publication Data

US 2013/0248191 A1  Sep. 26, 2013

(51) Int. Cl.
*E21B 43/267* (2006.01)

(52) U.S. Cl.
USPC .............. 166/280.1; 166/280.2; 166/308.2; 507/924

(58) Field of Classification Search
USPC ............. 166/280.1, 280.2, 281, 308.2, 308.5; 507/924
See application file for complete search history.

(56) References Cited

U.S. PATENT DOCUMENTS

| | | |
|---|---|---|
| 3,592,266 A | 7/1971 | Tinsley |
| 3,850,247 A | 11/1974 | Tinsley |
| 5,680,900 A | 10/1997 | Nguyen et al. |
| 5,833,000 A | 11/1998 | Weaver et al. |
| 5,839,510 A | 11/1998 | Weaver et al. |
| 5,853,048 A | 12/1998 | Weaver et al. |
| 6,287,639 B1 | 9/2001 | Schmidt et al. |
| 6,439,309 B1 | 8/2002 | Matherly et al. |
| 6,488,091 B1 | 12/2002 | Weaver et al. |
| 7,131,491 B2 | 11/2006 | Blauch et al. |
| 7,281,580 B2 | 10/2007 | Parker et al. |
| 7,281,581 B2 | 10/2007 | Nguyen et al. |
| 7,306,040 B1 | 12/2007 | Robb et al. |
| 7,325,608 B2 | 2/2008 | van Batenburg et al. |
| 7,334,636 B2 | 2/2008 | Nguyen |
| 7,581,590 B2 | 9/2009 | Lesko et al. |
| 7,825,074 B2 | 11/2010 | Schmidt et al. |
| 7,897,545 B2 | 3/2011 | Wilson et al. |
| 8,003,579 B2 | 8/2011 | Akarsu et al. |
| 8,066,068 B2 | 11/2011 | Lesko et al. |
| 8,076,271 B2 | 12/2011 | Blauch et al. |

(Continued)

FOREIGN PATENT DOCUMENTS

| | | |
|---|---|---|
| EP | 2175004 A1 | 4/2010 |
| WO | WO 2011/136678 A1 | 11/2011 |
| WO | WO 2011/136679 A1 | 11/2011 |
| WO | 2013148414 A1 | 10/2013 |

OTHER PUBLICATIONS

International Search Report and Written Opinion for PCT/US2013/032942 dated May 27, 2013.

*Primary Examiner* — Catherine Loikith

(74) *Attorney, Agent, or Firm* — McDermott Will & Emery LLP; Craig W. Roddy

(57) ABSTRACT

Methods of fracturing a subterranean formation penetrated by a well bore, that include the steps of placing a fracturing fluid comprising a first stabilizing substance into the subterranean formation at or above a pressure sufficient to create or enhance at least one fracture in the subterranean formation and placing a treatment fluid comprising a gel carrier fluid, degradable solids-free gel bodies, and solids-laden gel bodies into the fracture such that the solids-free gel bodies and the solids-laden gel bodies form multiple packs within the fracture. Breaking the gel carrier fluid and allowing the solids-free gel bodies to degrade to create a high porosity propped fracture formed of the solids-laden gel bodies wherein the propped fracture has a porosity of at least about 40%.

15 Claims, 2 Drawing Sheets

(56) References Cited

U.S. PATENT DOCUMENTS

| | | |
|---|---|---|
| 8,636,065 B2 * | 1/2014 | Lesko et al. ............... 166/280.1 |
| 2005/0277554 A1 | 12/2005 | Blauch et al. |
| 2006/0048944 A1 | 3/2006 | van Batenburg et al. |
| 2006/0157243 A1 | 7/2006 | Nguyen |
| 2007/0281870 A1 | 12/2007 | Robb et al. |
| 2008/0135242 A1 * | 6/2008 | Lesko et al. .................. 166/268 |
| 2010/0089580 A1 * | 4/2010 | Brannon et al. ........... 166/280.2 |
| 2010/0089581 A1 | 4/2010 | Nguyen et al. |
| 2010/0212898 A1 | 8/2010 | Nguyen et al. |
| 2010/0282464 A1 | 11/2010 | Medvedev et al. |
| 2010/0294500 A1 | 11/2010 | Lesko |
| 2010/0316447 A1 | 12/2010 | Schmidt et al. |
| 2011/0039737 A1 | 2/2011 | Schmidt et al. |
| 2011/0067868 A1 | 3/2011 | Le Roy-Delage et al. |
| 2011/0083849 A1 | 4/2011 | Medvedev et al. |
| 2011/0114313 A1 * | 5/2011 | Lesko et al. ............... 166/280.1 |
| 2011/0240293 A1 * | 10/2011 | Lesko et al. ............... 166/280.1 |

\* cited by examiner

METHODS OF FORMING HIGH-POROSITY FRACTURES IN WEAKLY CONSOLIDATED OR UNCONSOLIDATED FORMATIONS

BACKGROUND

The present invention relates to high porosity propped fractures and methods of creating high porosity propped fractures in portions of subterranean formations in weakly consolidated or unconsolidated formations.

Subterranean wells (such as hydrocarbon producing wells, water producing wells, and injection wells) are often stimulated by hydraulic fracturing treatments. In hydraulic fracturing treatments, a viscous fracturing fluid, which also functions as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid and then deposited in the fractures. These particulate solids, or "proppant particulates," serve to prevent the fractures from fully closing once the hydraulic pressure is removed. By keeping the fracture from fully closing, the proppant particulates aid in forming conductive paths through which fluids may flow.

Commonly used proppant particulates generally comprise substantially spherical particles, such as graded sand, bauxite, ceramics, or even nut hulls. Generally, the proppant particulates are placed in the fracture in a concentration such that they form a tight pack of particulates. Unfortunately, in such traditional operations, when fractures close upon the proppant particulates they can crush or become compacted, potentially forming non-permeable or low permeability masses within the fracture rather than desirable high permeability masses; such low permeability masses may choke the flow path of the fluids within the formation. Furthermore, the proppant particulates may become embedded in particularly soft formations, negatively impacting production.

The degree of success of a fracturing operation depends, at least in part, upon fracture porosity and conductivity once the fracturing operation is stopped and production is begun. Traditional fracturing operations place a large volume of proppant particulates into a fracture and the porosity of the resultant packed propped fracture is then related to the interconnected interstitial spaces between the abutting proppant particulates. Thus, the resultant fracture porosity from a traditional fracturing operation is closely related to the strength of the placed proppant particulates (if the placed particulates crush then the pieces of broken proppant may plug the interstitial spaces) and the size and shape of the placed particulate (larger, more spherical proppant particulates generally yield increased interstitial spaces between the particulates).

One way proposed to combat problems inherent in tight proppant particulate packs involves placing a much reduced volume of proppant particulates in a fracture to create what is referred to herein as a partial monolayer or "high porosity" fracture. In such operations the proppant particulates within the fracture may be widely spaced but they are still sufficient to hold the fracture open and allow for production. Such operations allow for increased fracture conductivity due, at least in part, to the fact the produced fluids may flow around widely spaced proppant particulates rather than just through the relatively small interstitial spaces in a packed proppant bed.

While this concept of partial monolayer fracturing has been investigated in the industry, the concept has not been successfully applied for a number of reasons. One problem is that successful placement of a partial monolayer of proppant particulates presents unique challenges in the relative densities of the particulates versus the carrier fluid. Another problem lies in the fact that placing a proppant that tends to crush or embed under pressure may allow the fracture to pinch or close in places once the fracturing pressure is released. In addition, pillar fracturing (formation of separate islands or pillars of proppant to hold open a fracture with open areas between the pillars) and partial monolayer fracturing (formation of a single layer of proppant to hold open a fracture with open areas between the proppant) is only feasible or applicable in strongly consolidated formations. Sand control in the weakly consolidated or unconsolidated formations greatly jeopardizes the completion of pillar and partial monolayer fracturing treatments. Examples of these prior known fracturing methods can be found in U.S. Pat. Nos. 3,592,266; 3,850,247; 7,281,581; 7,325,608; 7,334,636; 7,581,590; and 8,066,068 as well as U.S. Patent App. Pub. No. 2010/0282464; each of which is hereby incorporated by reference. In addition, publications WO 2011/136678 and WO 2011/136679 also describe earlier efforts to create nonheterogenous (pillar-type) proppant placements.

SUMMARY OF THE INVENTION

The present invention relates to high porosity propped fractures and methods of creating high porosity propped fractures in portions of subterranean formations in weakly consolidated or unconsolidated formations.

Some embodiments of the present invention provide methods of fracturing a subterranean formation penetrated by a well bore, that include the steps of placing a fracturing fluid comprising a first stabilizing substance into the subterranean formation at or above a pressure sufficient to create or enhance at least one fracture in the subterranean formation; placing a treatment fluid comprising a gel carrier fluid, degradable solid-free gel bodies, and solids-laden gel bodies into the fracture such that the solids-free gel bodies and the solids-laden gel bodies form multiple packs within the fracture; allowing the pressure within the subterranean formation to fall below a pressure sufficient to create or enhance at least one fracture in the subterranean formation; and, breaking the gel carrier fluid and allowing the solid-free gel bodies to degrade to create a high porosity propped fracture formed of the solids-laden gel bodies wherein the propped fracture has a porosity of at least about 40%.

Other embodiments of the present invention provide methods of forming a high porosity propped fracture in a subterranean formation, comprising: introducing a treatment fluid comprising a first stabilizing substance into the well bore at matrix flow rate; placing a fracturing fluid comprising a second stabilizing substance into the subterranean formation at or above a pressure sufficient to create or enhance at least one fracture in the subterranean formation; placing a treatment fluid comprising a gel carrier fluid, degradable solid-free gel bodies, and solids-laden gel bodies into the fracture such that the solids-free gel bodies and the solids-laden gel bodies form multiple packs within the fracture; allowing the pressure within the subterranean formation to fall below a pressure sufficient to create or enhance at least one fracture in the subterranean formation; and, breaking the gel carrier fluid and allowing the solid-free gel bodies to degrade to create a high porosity propped fracture formed of the solids-laden gel bodies wherein the propped fracture has a porosity of at least about 40%.

Still other embodiments of the present invention provide methods of fracturing a subterranean formation penetrated by a well bore, comprising: placing a fluid comprising a first stabilizing substance into the subterranean formation; placing a treatment fluid comprising a gel carrier fluid and solids-laden gel bodies into an open fracture such that the solids-laden gel bodies form multiple packs within the fracture; allowing the fracture to close; and, breaking the gel carrier fluid to create a high porosity propped fracture formed of the solids-laden gel bodies wherein the propped fracture has a porosity of at least about 40%.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
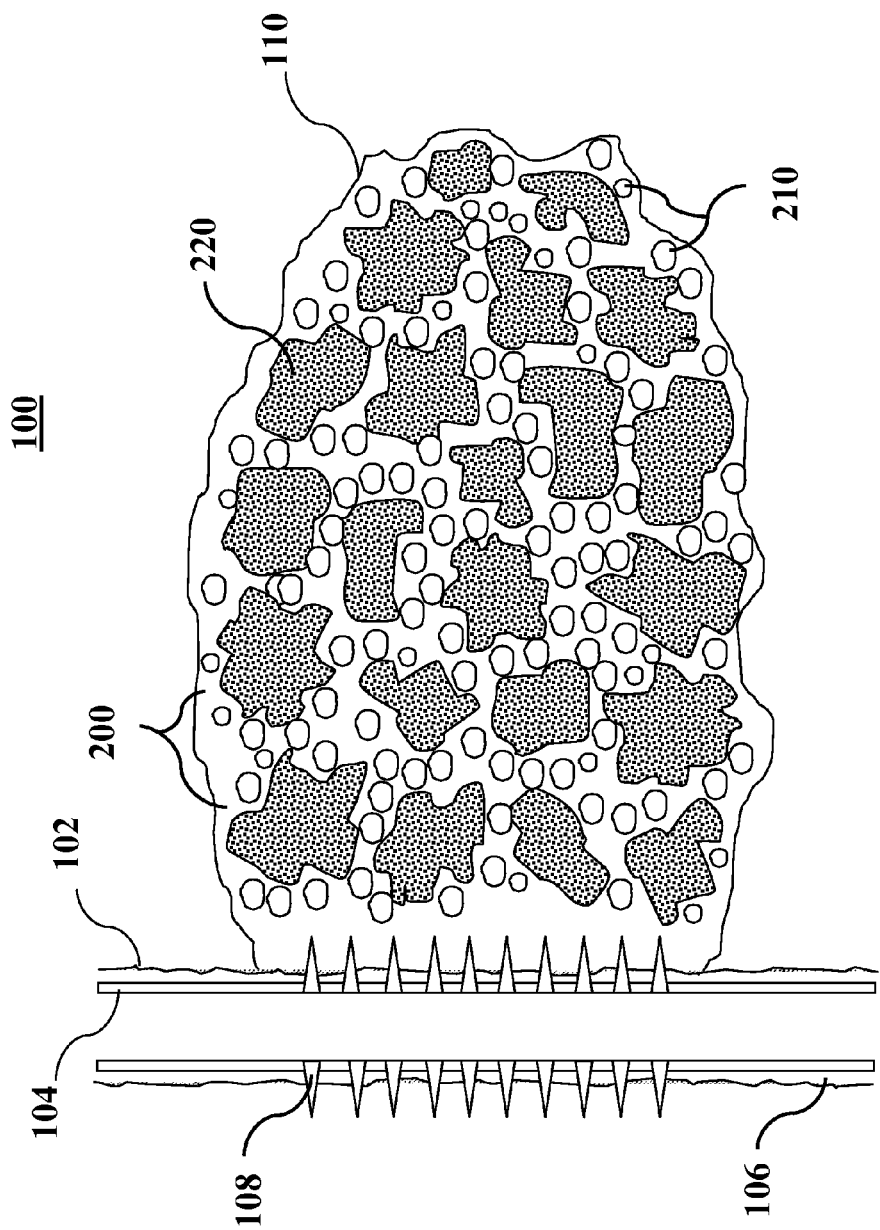
FIG. 1A depicts a schematic of a fracture that shows the placement of a treatment fluid comprising a gel carrier fluid, degradable solid-free gel bodies, and solids-laden gel bodies into the fracture such that the solids-free gel bodies and the solids-laden gel bodies form multiple packs within the fracture.

The present invention relates to high porosity propped fractures and methods of creating high porosity propped fractures in portions of subterranean formations in weakly consolidated or unconsolidated formations.

The present invention provides methods of creating high porosity fractures. In certain methods of the present invention, proppant particulates coated with a "stabilizing substance" are placed randomly within a subterranean fracture to create a high porosity propped fracture. The proppant aggregates function as pillars or masses to support and hold the fracture from completely closing. Voids or proppant-free channels surrounding the proppant aggregates greatly enhance the conductivity of the propped fracture, allowing the formation fluid to produce into or communicate with the wellbore freely. As used herein, the term "stabilizing substance" refers to a material that is capable of being coated onto a particulate and that exhibits a sticky or tacky character such that the proppant particulates that have the stabilizing substance thereon have a tendency to create clusters or aggregates. As used herein, the term "tacky," in all of its forms, generally refers to a substance having a nature such that it is (or may be activated to become) somewhat sticky to the touch. As used herein, the term "high porosity fracture" refers to a proppant fracture having a porosity greater than about 40%.

I. Consolidation of the Formation

While methods of forming high-porosity fractures have been described in the literature, such as in U.S. Pat. Nos. 7,281,580 and 7,281,581 (the entire disclosures of which are hereby incorporated by reference), application of the methods has been limited due to the consolidation level of the subterranean formation itself. That is, high-porosity fractures are particularly susceptible to formation particulate incursion due to weakly consolidated or unconsolidated formations. Formation sand or fines produced from these formations along with the producing fluid often cause damage to downhole or surface equipment and may drastically decrease production of the well. It has been discovered that stabilization of the formation in which the fracture resides can greatly improve the final conductivity and thus the final production ability of the fracture. As used herein the term "weakly consolidated formations" refers to those with Young's modulus less than $1\times10^6$ psi. Whereas the term "unconsolidated" refers to a formation wherein the particles are not held together by interstitial forces and are free to move or detach as a drag force resulting from the flowing fluid passing by.

In some preferred embodiments, the subterranean formation may be treated with a stabilizing substance during the action of creating the fracture within the subterranean formation. These embodiments may be preferred because, among other benefits, they remove the requirement of an additional operation before fracturing and forming the high-porosity fracture and because, unlike in a matrix operation, if the stabilizing substance is present while the fracture faces are created, then coverage of the substance over the majority of the fracture face is more. For example, the treatment of stabilizing substance can be performed during injection of pre-pad or pad fluid stage that initiates the fracture of the formation prior to the injection of the main fracturing fluid stage containing proppant slurry. The stabilizing substance is allowed to penetrate the formation matrix surrounding (or close to the vicinity of) the fracture faces.

In order to stabilize the surrounding formation, methods of the present invention use stabilizing substances to consolidate the formation, at least at the fracture faces that abut the proppant aggregates once the fracture is allowed to return to closure pressure. In some embodiments, a stabilizing substance may be placed into the subterranean formation surrounding a well bore at the desired intervals where the fractures are placed and allowed to penetrate into the formation at a matrix flow rate. As used herein, "matrix flow" refers to the placement of a fluid at pressure below the fracturing pressure such that it penetrates a distance into the matrix of formation particles without creating or extending fractures therein. One skilled in the art will recognize that, depending on the stabilizing substance chosen, it may be necessary to then shut-in the treated portion of the formation to allow the stabilizing substance to cure. By way of example, if the chosen stabilizing substance is a resin, a shut-in period may be required, whereas the use of a tackifying substance requires only that the tacky nature be activated rather than a cure time. Suitable stabilizing substances are described in more detail below.

II. High Porosity Propped Fractures.

According to some embodiments of the present invention, a fracturing fluid system may be used to create a high porosity propped fracture wherein three components are used together. In these embodiments, the first component is a carrier fluid, generally a gel or a crosslinked gel fluid. The second component comprises degradable, solids-free gel bodies wherein the gel bodies are in a form such as a blob, fragment, or chunk. The third component comprises solids-laden gel bodies wherein the solids are non-degradable proppant materials, in a form of such as aggregates, blobs, or clusters of such materials encapsulated by a degradable gel.

According to other embodiments of the present invention, a fracturing fluid system may be used to create a high porosity propped fracture wherein only solid-laden gel bodies and a carrier fluid, generally a gel or a crosslinked gel fluid, are used. In these embodiments, the solid-laden gel bodies, tend to form aggregates when placed into a subterranean formation, such that once the gelled carrier fluid is removed, what remains are multiple, separate clusters of solid-laden gel bodies that act as pillars to keep the fracture propped open once the fracturing pressure has been released.

In another embodiment, fibers may be included in the carrier fluid, the degradable, solids-free gel bodies, and/or solids-laden gel bodies. Fibers included in the gel bodies may exist partially inside of the gel body and partially outside. This may help suspend the gel bodies within the carrier fluid and can also act to keep separate gel bodies from merging to single, larger gel bodies. In some preferred embodiments the fibers may be degradable. It may be particularly advantageous to use degradable fibers in the solids-free gel bodies that are designed to degrade over time and in the carrier fluid that is designed to be broken. Preferably, the pressure within the subterranean formation is allowed to reduce below the pressure sufficient to create or enhance fractures within the subterranean formation after the gel bodies are placed and before the solid-free gel bodies degrade.

In the three component embodiments, the carrier fluid, solids-free gel bodies, and non-degradable solids-laden gel bodies are placed inside the fracture as a single mixture. Once placed within a fracture, the degradable components are allowed to break down into a liquid phase and are then removed from the propped fracture, leaving behind the non-degradable solids-laden aggregates or clusters that then act as islands or pillars to keep the fractures from closing while allowing voids and channels to form surrounding the solids particulate masses, and connecting the open flow paths to the wellbore.

The amounts of degradable solids-free gel bodies are generally selected to effectively surround the solids-laden gel bodies. Thus, in preferred embodiments, the degradable solids-free gel bodies are present in greater quantity than the solids-laden gel bodies such that the non-degradable solids-laden gel bodies are spaced apart from one another when placed; thus forming high porosity propped fractures. Thus the presence of the degradable solids-free gel bodies help to keep the solids-laden gel bodies from clumping together or from settling and forming a solid mass.

Gel bodies suitable for use in the present invention include those described in U.S. Patent Application Publication No. 2010/0089581, the entire disclosure of which is hereby incorporated by reference. In addition, the super-absorbent polymer discussed in U.S. Patent Application Publication No. 2011/0067868, the relevant discussion of which is hereby incorporated by reference, may also be suitable for use as gel bodies in the present invention. One of skill in the art will recognize that some of the gel bodies may be designed to degrade once the fracture closes, while other gel bodies may be more resistant to such degradation long after the closing of the fracture. In some instances, the gel used to form the solids-laden gel bodies preferably does not degrade under the conditions in the subterranean formation while the solids-free gel bodies preferably degrade after the fracture closes.

By way of example, gel bodies of the present invention may be formed from swellable polymers. Preferably, the swellable particulate is an organic material such as a polymer or a salt of a polymeric material. Typical examples of polymeric materials include, but are not limited to, cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion. Typical examples of suitable salts of polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. The specific features of the swellable particulate may be chosen or modified to provide a proppant pack or matrix with desired permeability while maintaining adequate propping and filtering capability. These swellable particulates are capable of swelling upon contact with a swelling agent. The swelling agent for the swellable particulate can be any agent that causes the swellable particulate to swell via absorption of the swelling agent. In a preferred embodiment, the swellable particulate is "water swellable," meaning that the swelling agent is water. Suitable sources of water for use as the swelling agent include, but are not limited to, fresh water, brackish water, sea water, brine, and any combination thereof in any proportion. In another embodiment of the invention, the swellable particulate is "oil swellable," meaning that the swelling agent for the swellable particulate is an organic fluid. Examples of organic swelling agents include, but are not limited to, diesel, kerosene, crude oil, and any combination thereof in any proportion.

Also by way of example, degradable gel bodies of the present invention may be formed from super-absorbent polymers. Suitable such super-absorbent polymers include polyacrylamide, crosslinked poly(meth)acrylate, and non-soluble acrylic polymers.

In some preferred embodiments the solids (proppant) used in the solids-laden gel bodies can be coated with a curable resin. The resin may cure in the subterranean formation to consolidate the proppant of the proppant pack to form a "proppant matrix." After curing, the resin improves the strength, clustering ability, and flow-back control characteristics of the proppant matrix relative to a similar proppant pack without such a curable resin. A proppant matrix may also be formed by incorporating a non-curable tackifying agent into at least a portion of the proppant. The tackifying agent can be used in addition to or instead of a curable resin.

The lower than traditional proppant loading in combination with a stabilizing substance as used in some embodiments of the present invention may allow for increased conductivity and increased proppant particulate performance, at least in part, because the high porosity fractures they form allow for increased levels of open channels. With a high porosity fracture there may be more open spaces in the propped fracture that may remain open, even under severe closure stresses than found in traditional, high proppant loading applications.

By increasing the percentage of open spaces within a propped fracture, the methods of the present invention may act not only to increase the available space for production but also to eliminate non-Darcy effects during production. Generally, non-Darcy effects are caused by inertial forces due to expansion and contraction of the local flow inside flow channels found in typical proppant packs. The high porosity propped fractures decrease or eliminate the cycles of expansion and contraction because the interstitial spaces found in traditional propped fractures are not present.

Figure 1B:
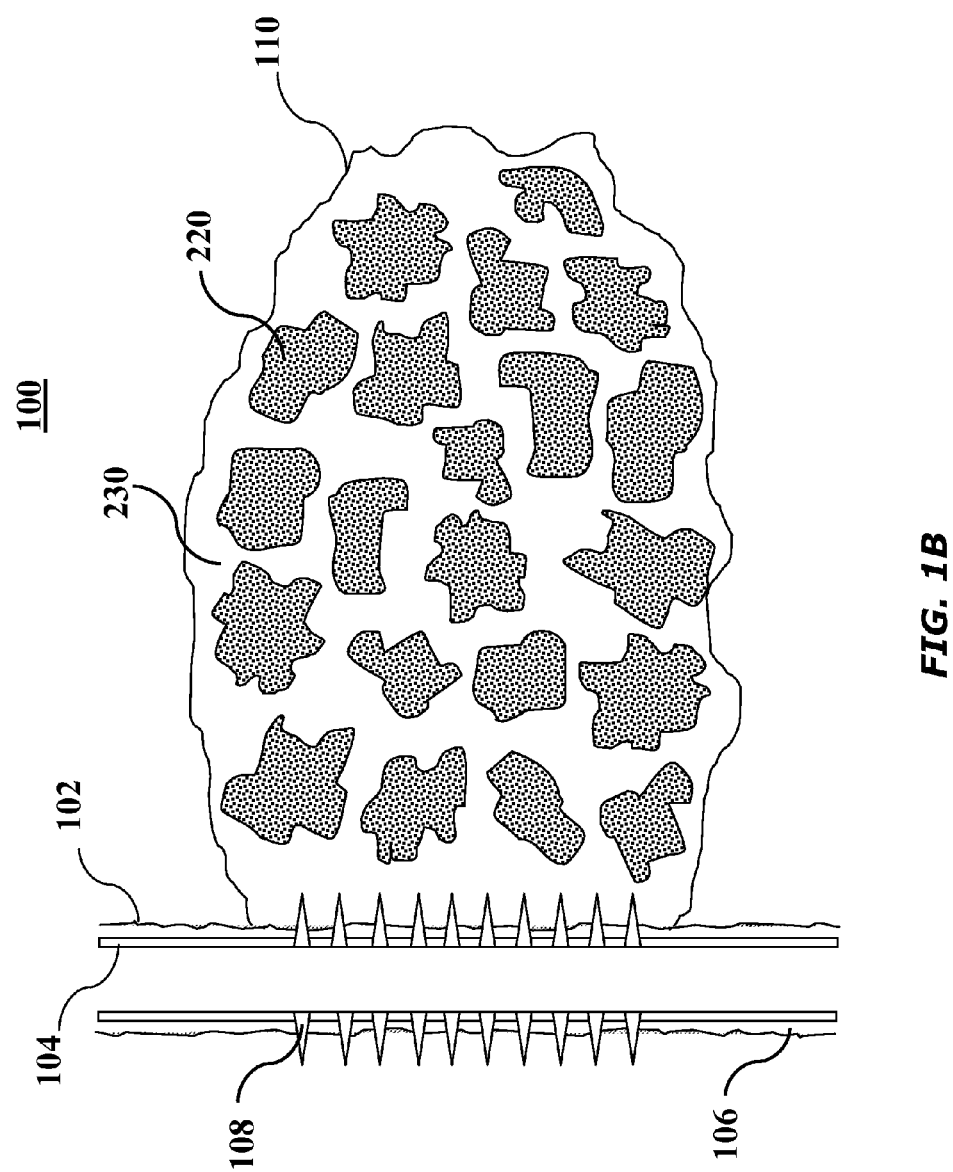
FIG. 1B depicts a schematic of the fracture shown in FIG. 1A after the gel carrier fluid has been removed and the degradable solid-free gel bodies have degraded.

Referring now to FIGS. 1A and 1B, certain embodiments of the present invention are illustrated after introduction of a plurality of solid-free and solid-laden gel bodies into the fracture(s) in a subterranean formation. Subterranean formation 100 is shown penetrated by well bore 102. While FIGS. 1A and 1B depict well bore 102 as a generally vertical well, the methods of the present invention also may be performed in generally horizontal, inclined, or otherwise formed portions of wells. While the methods of the present invention are also suitable for uncased well bores, well bore 102 is shown to be lined with casing 104 that is cemented to subterranean formation 100 by cement sheath 106. One or more perforations 108 are shown that extend through casing 104 and cement sheath 106 into subterranean formation 100. The one or more perforations 108 in casing 104 and cement sheath 106 may be created using any suitable technique. Furthermore, a fracture in subterranean formation 100 is depicted by FIGS. 1A and 1B as fracture 110 that extends in an essentially vertical plane that is approximately longitudinal or parallel to the axis of well bore 102. In FIG. 1A, the fracture is shown following the placement of a treatment fluid comprising a gel carrier fluid 200, degradable solid-free gel bodies 210, and solids-laden gel bodies 220 into the facture.

Once the fracture has closed and after a desired period of time (e.g., a shut-in period for the stabilizing substance to set as needed), the solids-free gel bodies 210 are allowed to degrade and leave behind open spaces between the solids-laden gel bodies, as shown in FIG. 1B. The plurality of solids-laden gel bodies 220 remain in fracture 110 after solids-free gel bodies 210 degrade, leaving voids 230 in the spaces between the solids-laden gel bodies 220. These voids provide flow paths for the production of hydrocarbons from subterranean formation 100.

The proppant particulates used in the present invention and coated with a stabilizing substance have the tendency to adhere to each other when they are in contact with one another. The stabilizing effect should be strong enough that the proppant particulates remain clustered together while under static conditions or under low shear rates. As the shear rate increases, the proppant clusters or aggregates may become dispersed into smaller clusters or even individual proppant particulates. This phenomenon may repeat again and again from the time the coated proppant is introduced into the fracturing fluid, pumped into the well bore and fracture, and even after being placed inside the fracture. After obtaining a curing period, the proppant particulates that have been coated with a curable resin become a solid mass to remain together as aggregates.

III. Suitable Proppant Particulates

A. Proppant Particulates—Size and Shape

Proppant particulates (or "solids" in the case of solids-laden gel bodies) suitable for use in the methods of the present invention may be of any size and shape combination known in the art as suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series. A major advantage of using this method is there is no need for the solid particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. By so resisting settling, substantially non-spherical proppant particulates may provide improved proppant particulate distribution as compared to more spherical proppant particulates.

B. Proppant Particulates—Materials

Proppant particulates suitable for use in the present invention may comprise any material suitable for use in subterranean operations. Suitable materials for these proppant particulates include, but are not limited to, sand, bauxite, ceramic materials, glass materials, polymer materials (such as EVA or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles for use in conjunction with the present invention may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

C. Degradable Particles

In some embodiments of the present invention, a portion of the proppant particulates may be formed from degradable particles. One purpose of including degradable particulates in a high porosity propped fracture (be it a high porosity fracture or a packed fracture) is to ensure the permeability of the propped fracture.

In some embodiments the degradable particles used are oil-degradable materials. Where such oil-degradable proppant particulates are used, in the event the closure of the fracture undesirably compacts the proppant (thus undesirably reducing the permeability of the proppant pack) the oil-degradable proppant may be degraded by the produced fluids, thus restoring at least some of the lost permeability. The degradable proppant may also be degraded by materials purposely placed in the formation by injection, mixing the degradable particle with delayed reaction degradation agents, or other suitable means to induce degradation.

In some embodiments of the present invention, a high porosity propped fracture may be formed using proppant particulates and degradable particulates. Thus, as the degradable particulates are removed with time, the porosity of the propped fracture increases. The degradable particulates are preferably substantially uniformly distributed throughout the formed proppant pack. Over time, the degradable material will degrade, in situ, causing the degradable material to substantially be removed from the proppant pack and to leave behind voids in the proppant pack. These voids enhance the porosity of the proppant pack, which may result, in situ, in enhanced conductivity.

Suitable degradable materials include oil-degradable polymers. Oil-degradable polymers that may be used in accordance with the present invention may be either natural or synthetic polymers. Some particular examples include, but are not limited to, polyacrylics, polyamides, and polyolefins such as polyethylene, polypropylene, polyisobutylene, and polystyrene. Other suitable oil-degradable polymers include those that have a melting point which is such that the polymer will melt or dissolve at the temperature of the subterranean formation in which it is placed such as a wax material.

In addition to oil-degradable polymers, other degradable materials that may be used in conjunction with the present invention include, but are not limited to, degradable polymers, dehydrated salts, and/or mixtures of the two. As for degradable polymers, a polymer is considered to be "degradable" herein if the degradation is due to, in situ, a chemical and/or radical process such as hydrolysis, or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

It is desirable that the degradable particulate has similar particle size, shape, and specific gravity as those of the proppant particulates used to enhance the distribution of degradable particulate among the lightweight particulate and to minimize the segregation between the particulate materials.

Suitable examples of degradable polymers that may be used in accordance with the present invention include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic or aromatic polycarbonates; poly(orthoesters); poly(amino acids); poly(ethylene oxides); and polyphosphazenes. Of these suitable polymers, aliphatic polyesters and polyanhydrides may be preferred.

Polyanhydrides are another type of particularly suitable degradable polymer useful in the present invention. Polyanhydride hydrolysis proceeds, in situ, via free carboxylic acid chain-ends to yield carboxylic acids as final degradation products. The degradation time can be varied over a broad range by changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components and may even be selected to improve the long term performance/conductivity of the propped fracture. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments a preferable result is achieved if the degradable material degrades slowly over time as opposed to instantaneously. Even more preferable results have been obtained when the degradable material does not begin to degrade until after the proppant matrix has developed some compressive strength. The slow degradation of the degradable material, in situ, helps to maintain the stability of the proppant matrix.

In some embodiments of the present invention, from about 10% to about 90% of the total proppant particulates used to form the high porosity fracture are degradable. In other embodiments, from about 20% to about 70% of the total proppant particulates used to form the high porosity fracture are degradable. In still other embodiments, from about 25% to about 50% of the total proppant particulates used to form the high porosity fracture are degradable. One of ordinary skill in the art with the benefit of this disclosure will recognize an optimum concentration of degradable material that provides desirable values in terms of enhanced conductivity or permeability without undermining the stability of the high porosity fracture itself.

IV. Suitable Stabilizing Substances

Stabilizing substances suitable for use in the present invention include non-aqueous tackifying agents; aqueous tackifying agents; silyl-modified polyamides; curable resin compositions that are capable of curing to form hardened substances; and combinations thereof. In other embodiments, degradable crosslinkable polymers may be used to help consolidate the solids, examples of such polymers may be found in U.S. Pat. Nos. 5,680,900, 7,897,545, 7,306,040, and U.S. Patent Application Publication No. 2007/0281870; all of which are hereby incorporated by reference in their entirely. In addition to encouraging the proppant particulates to form aggregates, the use of a stabilizing substance may yield a propped fracture that experiences very little or no undesirable proppant flow back. As described in more detail above, the application of a stabilizing substance to the proppant particulates used to create a high porosity fracture may aid in the formation of aggregates that increase the ability of a small amount of proppant particulates to effectively hold open a fracture for production. Stabilizing substances may be applied on-the-fly, applying the stabilizing substance to the proppant particulate at the well site, directly prior to pumping the fluid-proppant mixture into the well bore. In some preferred embodiments, the stabilizing substance is an aqueous tackifier or an emulsified resin having an aqueous external layer.

A. Stabilizing Substances—Non-Aqueous Tackifying Agents

Tackifying agents suitable for use in the consolidation fluids of the present invention comprise any compound that, when in liquid form or in a solvent solution, will form a non-hardening coating upon a particulate. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. Nos. 5,853,048 and 5,833,000 issued to Weaver, et al., the entire disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the entire disclosure of which is herein incorporated by reference.

Solvents suitable for use with the tackifying agents of the present invention include any solvent that is compatible with the tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d' limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

B. Stabilizing Substances—Aqueous Tackifying Agents

Suitable aqueous tackifier agents are capable of forming at least a partial coating upon the surface of a particulate (such as a proppant particulate). Generally, suitable aqueous tackifier agents are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifier compound is placed in the subterranean formation. In some embodiments, a pretreatment may be first contacted with the surface of a particulate to prepare it to be coated with an aqueous tackifier compound. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifier compound may enhance the grain-to-grain contact between the individual particulates within the formation (be they proppant particulates, formation fines, or other particulates), helping bring about the consolidation of the particulates into a cohesive, flexible, and permeable mass.

Examples of aqueous tackifier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifier agents and additional disclosure on aqueous tackifier agents can be found in U.S. Pat. No. 8,076,271 and U.S. Pat. No. 7,131,491 the entire disclosures of which are hereby incorporated by reference.

C. Stabilizing Substances—Silyl-Modified Polyamides

Silyl-modified polyamide compounds suitable for use as a stabilizing substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the entire disclosure of which is herein incorporated by reference.

D. Stabilizing Substances—Binders

Binders suitable for using the present invention may generally comprise a heterocondensate of (1) a hydrolysable silicon compound having at least one nonhydrolysable organic radical without polymerizable group and (2) a metal and/or boron compound. Such binders may be prepared by hydrolyzing (1), above, with water; adding (2), above, to the resultant reaction mixture after the water in the reaction mixture is substantially consumed; and, optionally, adding an organic binder component to the heterocondensate and/or a precursor thereof. Such binders are described in more detail in U.S. Patent App. Pub. No. 2010/0316447, the entire disclosure of which is hereby incorporated by reference.

In addition, binders suitable for using the present invention may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates. Such binders are described in more detail in U.S. Patent App. Pub. No. 2011/0039737 and U.S. Pat. No. 8,003,579, the entire disclosures of which are hereby incorporated by reference.

Other binders suitable for using the present invention may generally comprise:

(I) a consolidant comprising a hydrolyzate or precondensate of (a) at least one organosilane of the general formula (I):

$$R_nSiX_{4-n} \quad (I)$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general formula (II)

$$SiX_4 \quad (II)$$

in which the X radicals are each as defined above, and (c) at least one metal compound of the general formula (III)

$$MX_a \quad (III)$$

in which M is a metal of main groups I to VIII or of transition groups II to VIII of the Periodic Table of the Elements including boron, X is as defined in formula (I), where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the consolidant is cured under elevated pressure and elevated temperature, where the consolidant, in the case that it is used to change the wetting behavior of the formation, also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

Such binders are described in more detail in U.S. Pat. Nos. 7,825,074 and 6,287,639, the entire disclosures of which are hereby incorporated by reference.

F. Stabilizing Substances—Curable Resins

Resins suitable for use in the consolidation fluids of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, silicon-based resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing. By way of example, a silicon-based resin system as described in U.S. Patent Application Publication 2010/0212898, the entire disclosure of which is hereby incorporated by reference, may be used as a more eco-friendly choice in cases where epoxy or furan-based resins pose environmental concerns.

Any solvent that is compatible with the resin and achieves the desired viscosity effect is suitable for use in the present invention. Preferred solvents include those listed above in connection with tackifying compounds. It is within the ability of one skilled in the art, with the benefit of this disclosure, to determine whether and how much solvent is needed to achieve a suitable viscosity.

V. Fracturing and Proppant Transport Fluids

Any treatment fluid suitable for a fracturing or frac-packing application may be used in accordance with the teachings of the present invention as a spacer fluid, fracturing fluid, or treatment fluid, including aqueous gels, viscoelastic surfactant gels, oil gels, foamed gels, and emulsions. These fluids may be jointly referred to as "treatment fluids" herein. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, fracturing fluid, in situ, reduces fluid loss and allows the fluid to transport significant quantities of suspended proppant particles. The water used to form the treatment fluid may be salt water, brine, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprises polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers generally are present in the viscosified treatment fluids of the present invention in an amount sufficient to provide, in situ, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place proppant particles in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of fracturing a subterranean formation penetrated by a well bore, comprising:
   placing a fracturing fluid comprising a first stabilizing substance into the subterranean formation at or above a pressure sufficient to create or enhance at least one fracture in the subterranean formation;
   placing a treatment fluid comprising a gel carrier fluid, degradable solids-free gel bodies, and solids-laden gel bodies into the fracture such that the solids-free gel bodies and the solids-laden gel bodies form multiple packs within the fracture;
   allowing the pressure within the subterranean formation to fall below a pressure sufficient to create or enhance at least one fracture in the subterranean formation; and,
   breaking the gel carrier fluid and allowing the solids-free gel bodies to degrade to create a high porosity propped fracture formed of the solids-laden gel bodies wherein the propped fracture has a porosity of at least about 40%.

2. The method of claim 1 wherein the stabilizing substance is selected from the group consisting of a non-aqueous tackifying agent; an aqueous tackifying agent; a silyl-modified polyamide; a curable resin composition; a binder; and combinations thereof.

3. The method of claim 1 wherein fibers are included as a component of the treatment fluid selected from the group consisting of: the solids-free gel bodies, the solids-laden gel bodies, the gel carrier fluid, and combinations thereof.

4. The method of claim 1 wherein the gel portion of the degradable solids-free gel bodies, and solids-laden gel bodies comprise a swellable polymer selected from the group consisting of a cross-linked polyacrylamide, a crosslinked poly(meth)acrylate, a cross-linked polyacrylate, a cross-linked copolymer of acrylamide and acrylate monomer, a starch grafted with acrylonitrile and acrylate, a cross-linked polymer of two or more of allylsulfonates, 2-acrylamido-2-methyl-1-propanesulfonic acid, 3-allyloxy-2-hydroxy-1-propanesulfonic acid, acrylamide, an acrylic acid monomer, a non-soluble acrylic polymer, and any combination thereof.

5. The method of claim 1 wherein the gel portion of the degradable solids-free gel bodies, and solids-laden gel bodies comprise a salt selected from the group consisting of a salt of carboxyalkyl starch, a salt of carboxymethyl starch, a salt of carboxymethyl cellulose, a salt of cross-linked carboxyalkyl polysaccharide, a starch grafted with acrylonitrile and acrylate monomers, and any combination thereof.

6. A method of forming a high porosity propped fracture in a subterranean formation, comprising:
   introducing a first treatment fluid comprising a first stabilizing substance into a well bore at matrix flow rate;
   placing a fracturing fluid comprising a second stabilizing substance into the subterranean formation at or above a pressure sufficient to create or enhance at least one fracture in the subterranean formation;
   placing a second treatment fluid comprising a gel carrier fluid, degradable solids-free gel bodies, and solids-laden gel bodies into the fracture such that the solids-free gel bodies and the solids-laden gel bodies form multiple packs within the fracture;
   allowing the pressure within the subterranean formation to fall below a pressure sufficient to create or enhance at least one fracture in the subterranean formation; and,
   breaking the gel carrier fluid and allowing the solids-free gel bodies to degrade to create a high porosity propped fracture formed of the solids-laden gel bodies wherein the propped fracture has a porosity of at least about 40%.

7. The method of claim 6 wherein the second treatment fluid further comprises degradable particles.

8. The method of claim 6 wherein the step of introducing a treatment fluid comprising a first stabilizing substance occurs after the step of introducing a fracturing fluid comprising a second stabilizing substance into the well bore at or above a pressure sufficient to create or enhance at least one fracture in the subterranean formation.

9. The method of claim 6 wherein the step of introducing a treatment fluid comprising a first stabilizing substance occurs before the step of introducing a fracturing fluid comprising a second stabilizing substance into the well bore at or above a pressure sufficient to create or enhance at least one fracture in the subterranean formation.

10. The method of claim 6 wherein the first stabilizing substance is not the same as the second stabilizing substance.

11. The method of claim 6 wherein the first stabilizing substance is selected from the group consisting of a non-aqueous tackifying agent; an aqueous tackifying agent; a silyl-modified polyamide; a curable resin composition; a binder; and combinations thereof.

12. The method of claim 6 wherein the second stabilizing substance is selected from the group consisting of a non-aqueous tackifying agent; an aqueous tackifying agent; a silyl-modified polyamide; a curable resin composition; a binder; and combinations thereof.

13. The method of claim 6 wherein fibers are included as a component of the treatment fluid selected from the group consisting of: the solids-free gel bodies, the solids-laden gel bodies, the gel carrier fluid, and combinations thereof.

14. The method of claim 6 wherein the gel portion of the degradable solids-free gel bodies, and solids-laden gel bodies comprise a swellable polymer selected from the group consisting of a cross-linked polyacrylamide, a crosslinked poly(meth)acrylate, a cross-linked polyacrylate, a cross-linked copolymer of acrylamide and acrylate monomer, a starch grafted with acrylonitrile and acrylate, a cross-linked polymer of two or more of allylsulfonates, 2-acrylamido-2-methyl-1-propanesulfonic acid, 3-allyloxy-2-hydroxy-1-propanesulfonic acid, acrylamide, an acrylic acid monomer, a non-soluble acrylic polymer, and any combination thereof.

15. The method of claim 6 wherein the gel portion of the degradable solids-free gel bodies, and solids-laden gel bodies comprise a salt selected from the group consisting of a salt of carboxyalkyl starch, a salt of carboxymethyl starch, a salt of carboxymethyl cellulose, a salt of cross-linked carboxyalkyl polysaccharide, a starch grafted with acrylonitrile and acrylate monomers, and any combination thereof.

\* \* \* \* \*